United States Patent
Al Ahmad et al.

(10) Patent No.: US 11,071,337 B1
(45) Date of Patent: Jul. 27, 2021

(54) PERSONAL PROTECTION DEVICE AGAINST VIRUSES AND ARTICLE OF APPAREL AND DEVICE AND METHOD FOR MAKING A VACCINE

(71) Applicant: United Arab Emirates University, Al Ain (AE)

(72) Inventors: Mahmoud F. Y. Al Ahmad, Al Ain (AE); Tahir A. Rizvi, Al Ain (AE); Farah Mustafa, Al Ain (AE)

(73) Assignee: United Arab Emirates University, Al Ain (AE)

( * ) Notice: Subject to any disclaimer, the term of this patent is extended or adjusted under 35 U.S.C. 154(b) by 0 days.

(21) Appl. No.: 16/932,065

(22) Filed: Jul. 17, 2020

(51) Int. Cl.
*A41D 13/11* (2006.01)
*A41D 1/00* (2018.01)
(Continued)

(52) U.S. Cl.
CPC .......... *A41D 13/1192* (2013.01); *A41D 1/005* (2013.01); *A41D 13/11* (2013.01); *A41D 31/30* (2019.02); *H02J 7/0063* (2013.01)

(58) Field of Classification Search
CPC .................... A41D 13/00; A41D 13/05; A41D 13/11–1192; A41D 1/00–005;
(Continued)

(56) References Cited

U.S. PATENT DOCUMENTS 7,392,806 B2 * 7/2008 Yuen ...................... A62B 19/00
128/205.27

8,181,385 B2  5/2012 Mars
(Continued)

FOREIGN PATENT DOCUMENTS

CN    101966987 A    2/2011
CN    203400387 U    1/2014
(Continued)

OTHER PUBLICATIONS

Barik, Avijit, Xiaoshu Chen, and Sang-Hyun Oh. "Ultralow-Power Electronic Trapping of Nanoparticles with Sub-10 nm Gold Nanogap Electrodes". Nano Letters, 2016, 16, 6317-6324. (Year: 2016).*
(Continued)

*Primary Examiner* — Tu A Vo
*Assistant Examiner* — Jacqueline M Pinderski
(74) *Attorney, Agent, or Firm* — Boyle Fredrickson, S.C.

(57) ABSTRACT

A virus protection device 16 for protecting a user from a virus 14 includes a first flexible electrode 22 and a second flexible electrode 24 both formed of graphene and connected to a battery. The electrodes 22,24 are configured in a fractal arrangement and define a fractal-like structure 25 comprises a main branch 27 of electrodes 22, 24 and a plurality of side branches 28, secondary branches 30, tertiary branches 32, and subsequent branches 34 extending outwardly from the branch 27. The branches 27,28 30, 32 and 34 together form multiple nodes of flexible opposed positive electrodes 36.1 and negative electrodes 36.2 which are spaced an equal distance apart from one another, to define predetermined spaces there between, through which electrical current is capable of flowing between the electrodes 36.1, 36.2 for incapacitating viruses contacting the device 16 or passing through the spaces between the electrodes 36.1 and 36.2.

19 Claims, 7 Drawing Sheets

(51) Int. Cl.
*H02J 7/00* (2006.01)
*A41D 31/30* (2019.01)

(58) Field of Classification Search
CPC ........ H02J 7/0063; A62B 23/00; A62B 23/02;
A62B 23/025; A62B 23/06; A62B 18/00;
A62B 18/08; A62B 18/02; A62B 18/025;
A62B 7/00; A62B 9/00; B03C 3/00;
B03C 3/40; B03C 3/41; B03C 3/45;
B03C 3/86; B03C 9/00; B03C 2201/10;
B03C 2201/26
USPC ............................................ 422/121, 186.04
See application file for complete search history.

(56) References Cited

U.S. PATENT DOCUMENTS

| | | | |
|---|---|---|---|
| 9,972,723 | B2 | 5/2018 | Al Ahmad et al. |
| 10,401,139 | B2 | 9/2019 | Al Ahmad et al. |
| 2013/0256211 | A1 | 10/2013 | Fleming |
| 2019/0194023 | A1* | 6/2019 | Gunasekaran .......... C01B 32/19 |

FOREIGN PATENT DOCUMENTS

| | | | |
|---|---|---|---|
| CN | 106038324 | A | 10/2016 |
| CN | 106714344 | A | 5/2017 |
| CN | 106941736 | A | 7/2017 |
| CN | 206933397 | U | 1/2018 |
| CN | 206951409 | U * | 2/2018 |
| CN | 208941096 | U | 6/2019 |
| KR | 101211850 | B1 | 12/2012 |
| KR | 20180032803 | A * | 4/2018 |

OTHER PUBLICATIONS

India Block, Guardian G-Volt masks would use graphene and electrical charge to repel viruses and bacteria, https://www.dezeen.com (Mar. 6, 2020).
Graphene to potentially help in the fight against Coronavirus, according to Planartech's CEO, https://www.graphene-info.com (Mar. 6, 2020).
New face masks use graphene and electrical charge to rpeel viruses and bacteria, https://www.graphene-info.com (Mar. 6, 2020).
AFP, Shocker! Japan firms' electrifying fabric zaps bacteria, RTL Today, https://today.rtl.lu/news/science-and-environment/a/1529542 (Jun. 7, 2020).
Majid Roohandeh and Taravat Bamdad, Inactivation of Herpes Simplex Virus Type 1 & Adenovirus Type 5 by Direct Electric Current at a Biocompatible Level in Vitro, https://pubmed.ncbi.nlm.nih.gov/21888012 (Jun. 7, 2020).
Zhiyong Song, Ziaoyu Wang, Genxing Zhu, Qinggong Nian, Hangyu Zhou, Dong Yang, Chengfeng Qin, and Ruikang Tang, Virus Capture and Destruction by Label-Free Graphene Oxide for Detection and Disinfection Applications, Small 2015, 11, No. 9-10, 1171-1176 (Oct. 2014).

* cited by examiner

PERSONAL PROTECTION DEVICE AGAINST VIRUSES AND ARTICLE OF APPAREL AND DEVICE AND METHOD FOR MAKING A VACCINE

FIELD OF INVENTION

The present invention relates to a personal protection device against viruses and article of apparel incorporating the device. The invention relates also to a device and method of making a vaccine.

BACKGROUND TO INVENTION

In this specification the term "article of apparel" shall be interpreted broadly to include any article which can be worn by a user, such as, for example, a facemask, scarf, bandanna, balaclava or any other type of head gear and shall specifically include any other article of apparel which may be worn on a head or body of a user.

Viral outbreaks are known to cause widespread disease and loss of life, particularly, when they become pandemic. Pandemics furthermore result in numerous social and economic problems which emerge on a global scale, as has been the case with the recent COVID-19 pandemic.

The COVID-19 pandemic has highlighted the need for articles of apparel such as facemasks and other protective devices which are able to offer users protection from exposure to active virulent viral particles such as, for example, COVID-19 viral particles.

More particularly, personal protection is, in the case of COVID-19 and certain other viruses, extremely important as studies show that exposure to even a few viral particles can result in contracting COVID-19 or other viruses. More specifically, some studies show, for example, that as few as ten viral particles is all that is needed for a person to contact COVID-19. Other studies show that anywhere from a few hundred to a few thousand COVID-19 viruses are required for a person to contact COVID-19. In view of the low viral load required to start a COVID-19 infection, it is clear that even a slight improvement in the effectiveness of the article of apparel, mask or other protective device may make the difference between contracting the disease and avoiding the disease.

Accordingly, a need exists for a device and/or apparel and/or facemask which are more effective at incapacitating and or preventing the ingress of the maximum number of viruses compared to known masks and other known protective devices.

In this specification the term "incapacitate" used in relation to a virus shall be interpreted to mean that the virus is either fully destroyed, or partially destroyed or at least rendered inactive due to being incapacitated, in other words, the virus is no longer able to infect or negatively impact a potential host of the virus.

SUMMARY OF INVENTION

According to a first aspect of the invention there is provided a virus protection device for protecting a user from a virus, the virus protection device including:
at least one first flexible electrode formed of graphene and at least one second flexible electrode formed of graphene;
the first and the second flexible electrodes being connectable to an electrical power source for supplying electrical power to the first and second flexible electrodes,
the first and the second flexible electrodes being configured and arranged in one of an interdigitated and a fractal arrangement wherein the first and the second flexible electrodes together define multiple nodes of opposed positive electrodes and negative electrodes which are spaced an equal distance apart from one another, thereby to define predetermined spaces there between, through which electrical current is capable of flowing between the positive and negative flexible electrodes.

In a particular embodiment, the virus protection device may be connected to an article of apparel worn by the user. In another embodiment, the virus protection device may form a part of the article of apparel. More specifically, the article of apparel may be a facemask worn by the user. As such, the facemask may be worn so as to cover a mouth and nose of the user. More specifically, the virus protection device may be connected to the mask by one of adhering, connecting, joining, securing, fixing, transferring, depositing, and exfoliating the virus protection device onto said article of apparel.

In a particular embodiment, the first and the second flexible electrodes may be configured and arranged to define a fractal-like structure wherein the first and second flexible electrodes comprise a main branch and side branches extend outwardly from the main branch of the first and the second flexible electrodes, and wherein the main branch of the first and second flexible electrodes and the side branches together define said multiple nodes of opposed positive and negative electrodes.

In another embodiment, the side branches may define one or more secondary branches which extend outwardly from the side branches and wherein the main branch of the first and second flexible electrodes, the side branches and the secondary branches together form said multiple nodes of opposed positive and negative electrodes.

In yet another embodiment, the secondary branches may define one or more tertiary branches which extend outwardly from the secondary branches and wherein the main branch of the first and second flexible electrodes, the side branches, the secondary branches and the tertiary branches together form said multiple nodes of opposed positive and negative electrodes.

In still another embodiment, the tertiary branches may define one or more subsequent branches which extend outwardly from the tertiary branches and wherein the main branch of the first and second flexible electrodes, the side branches, the secondary branches, the tertiary branches and the subsequent branches together form said multiple nodes of opposed positive and negative electrodes.

As this is a fractal-like structure, it will be understood subsequent branches includes further levels of branching as may be desired to achieve the full advantage of the invention as described and defined herein.

In use, the fractal-like structure enhances the surface area of the first and the second flexible electrodes and thereby maximize a volume of said predetermined spaces. Furthermore, the fractal-like structure establishes a uniform electric field across the virus protection device.

In a particular embodiment, said predetermined spaces between the opposed positive and negative electrodes is dimensioned to be smaller than a dimension of the virus, thereby to provide a filter preventing the virus from passing through the predetermined spaces between the of positive and negative electrodes.

In another embodiments, said predetermined spaces between the opposed positive and negative electrodes is dimensioned to permit the virus to pass into said predetermined spaces such that the electrical current flowing between the positive and negative flexible electrodes passes through the virus, thereby to incapacitate the virus. More specifically, in the embodiment wherein said predetermined spaces are dimensioned to permit the virus to pass into said predetermined spaces, said predetermined spaces should be as small as possible to maximise the applied electrical field passing though said predetermined spaces. A distance between the opposed positive and negative electrodes may range from between 4 nm to 500 nm. More specifically, the distance between the opposed positive and negative electrodes may range from between 4 nm and 100 nm.

Said predetermined spaces may form air flow passages through which air may flow through the virus protection device. Accordingly, said predetermined spaces must be sufficiently large to permit adequate airflow to permit the user to breath.

In accordance with a second aspect of the invention, there is provided an article of apparel including the virus protection device as described and defined herein above. The article of apparel may be a facemask. The article of apparel may further include a power supply for supplying said electrical power to the virus protection device. The virus protection device may include a power source in the form of a battery to provide said power supply. The battery may be a direct current (DC) power source which supplies direct current (DC). The battery may supply a current of 1 uA to 100 mA. The battery may supply a voltage source up to 3 volts.

According to a third aspect of the invention there is provided a device for making a vaccine, the device including one or more features as described hereinbelow in accordance with the third aspect of the invention and as illustrated in the drawings.

According to a fourth aspect of the invention there is provided a method for making a vaccine, the method including one or more steps as described hereinbelow in accordance with the fourth aspect of the invention and as illustrated in the drawings.

BRIEF DESCRIPTION OF DRAWINGS

Further features of the invention are described hereinafter by way of a non-limiting example of the invention, with reference to and as illustrated in the accompanying schematic drawings. In the drawings.

DETAILED DESCRIPTION

Figure 2:
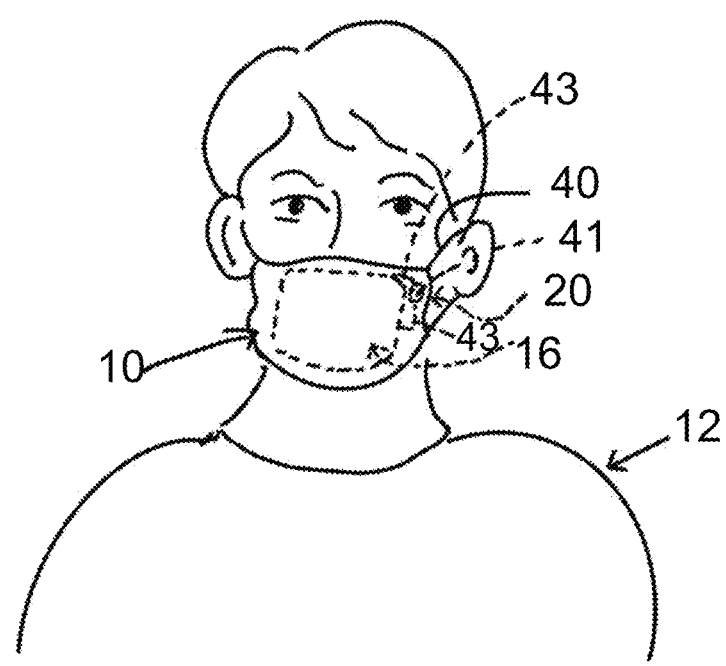
FIG. 2 shows a perspective view of a user wearing the facemask of FIG. 1.

With reference to the drawings, an article of apparel in accordance with a second aspect of the invention, in the form of a facemask, is designated generally by reference numeral 10. The facemask 10 is configured to be worn by a user 12 as illustrated in FIG. 2 of the drawings, for protecting the user against viral particles 14 as will be explained hereinbelow.

The facemask 10 includes a virus protection device in accordance with a first aspect of the invention, designated generally by the reference numeral 16, wearable face covering 18; and a power supply 20 for supplying electrical power to the virus protection device 16, as will be explained in more detail below.

Figure 1:
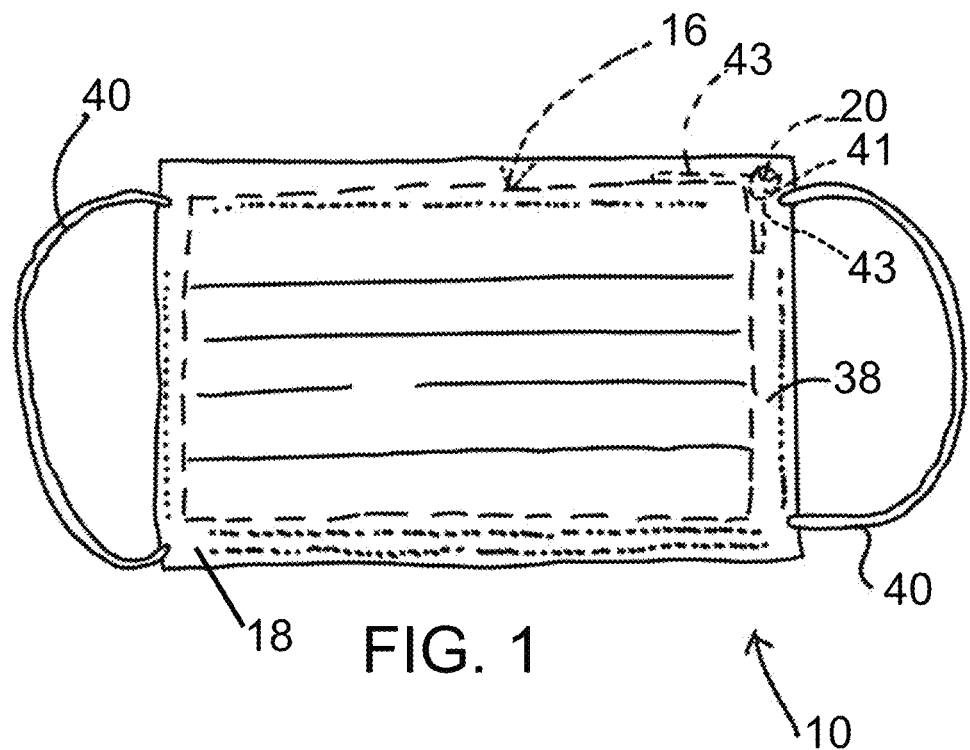
FIG. 1 shows a front view of a facemask in accordance with a second aspect of the invention which incorporates a virus protection device in accordance with a first aspect of the invention.
Figure 3:
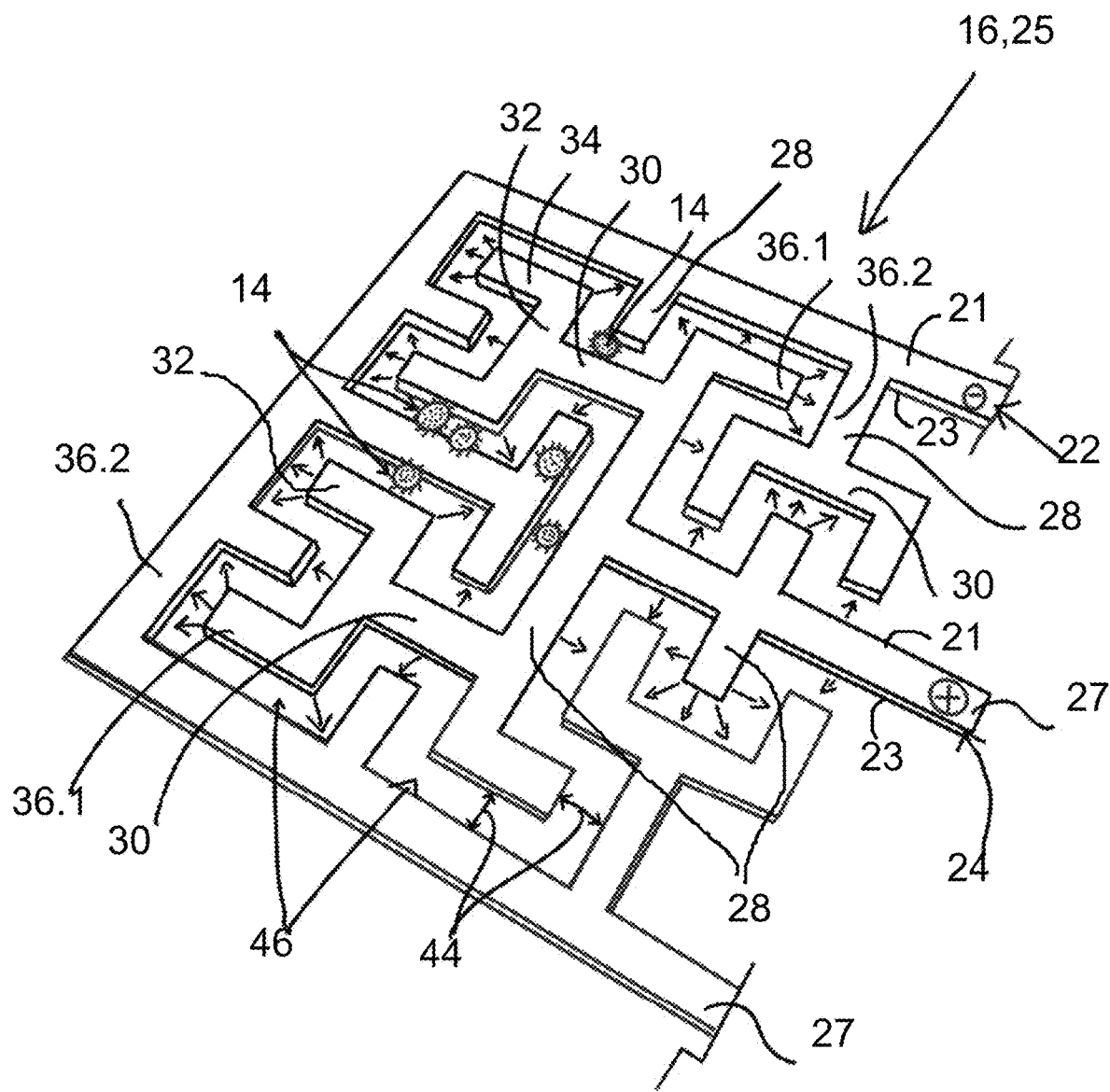
FIG. 3 shows a schematic perspective view of the virus protection device of FIG. 1.

The virus protection device 16 is best illustrated in FIGS. 1 and 3 of the drawings and is configured for incapacitating viral particles 14 as will be explained in more detail below.

As shown in FIG. 3 of the drawings, the virus protection device 16 includes broadly a first flexible electrode 22 and a second flexible electrode 24, configured and arranged in a fractal-like 25 structure.

Figure 4:
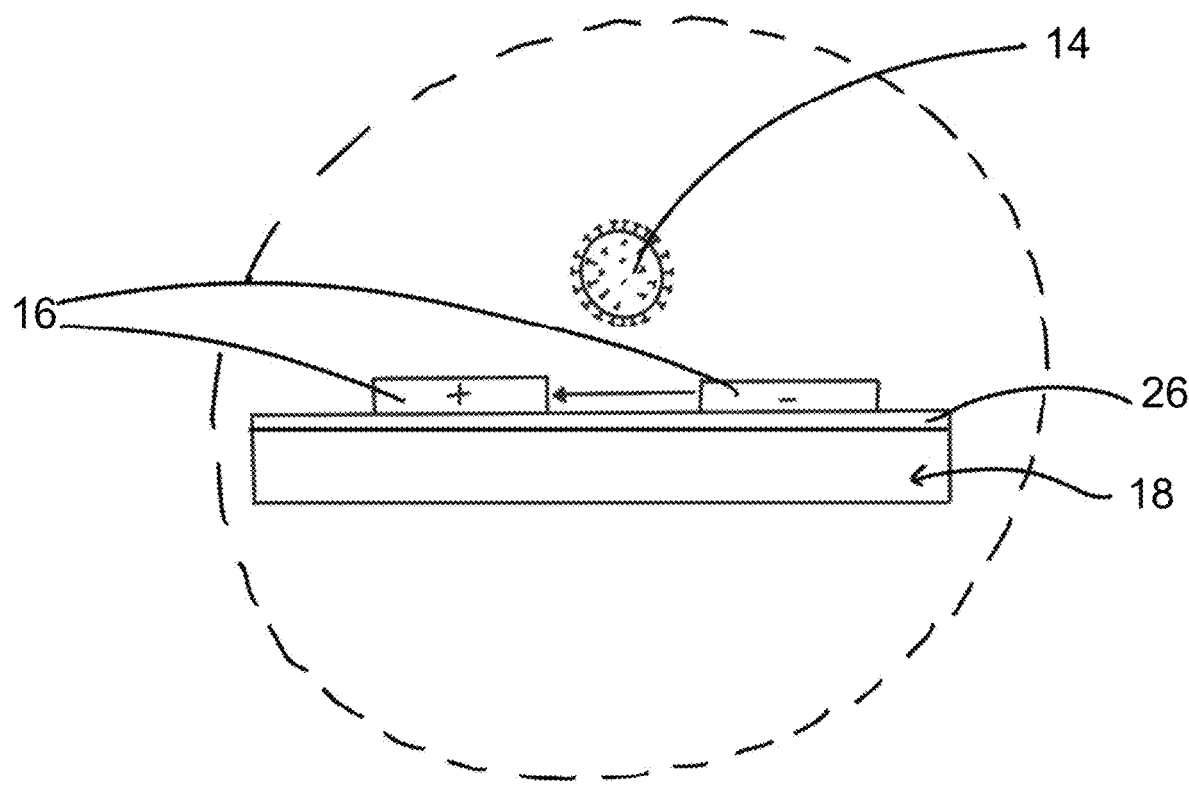
FIG. 4 shows a fragmentary side view of a portion of the mask of FIG. 1, showing opposed positive and negative electrodes of the virus protection device of FIG. 3.

As shown in FIG. 4 of the drawings, the first flexible electrode 22 and the second flexible electrode 24 are formed of graphene. The first flexible electrode 22 and the second flexible electrode 24 have a flexible backing later 26 of flexible sheet material applied thereto. The inventors envisage that the flexible backing layer may be of a suitable plastics or polymer material, such as, for example, polycarbonate or Polyethylene terephthalate glycol (PETG) sheets. The first flexible electrode 22 and the second flexible electrode 24 each have opposite major sides 21 and 23, said major sides 21, 23 being the largest sides of the electrodes 22, 24.

As illustrated in FIG. 3 of the drawings, the fractal-like structure 25 comprises a main branch 27 of the first flexible electrode 22 and the second flexible electrode 24 as well as a plurality of side branches 28, a plurality of secondary branches 30, a plurality of tertiary branches 32, and a plurality of subsequent branches 34 extending outwardly from the main branch 27 of the first flexible electrode 22 and from the second flexible electrode 24. The main branch 27 of the first flexible electrode 22 and the second flexible electrode 24, the side branches 28, secondary branches 30, the tertiary branches 32 and the subsequent branches 34 together form multiple nodes of flexible opposed positive electrodes 36.1 and negative electrodes 36.2 as best illustrated in FIG. 3 of the drawings.

More specifically, as can be seen from FIG. 3 of the drawings the plurality of side branches 28 branch from the main branch 27 of the first flexible electrode 22 and the second flexible electrode 24. The plurality of secondary branches 30 branch from the plurality of side branches 28. The plurality of tertiary branches 32 branch from the secondary branches 30. The plurality of subsequent branches 34 branch from the plurality of tertiary branches 32.

The multiple nodes of opposed positive and negative electrodes 36.1,36.2 are spaced an equal distance apart from one another, thereby to define predetermined spaces there between of approximately 50 nm, the purposes of which will be explained below.

As shown in FIGS. 1 and 2 of the drawings, the wearable face covering 18 comprises a nose and mouth covering element 38 of flexible material and elasticated straps 40 for securing the facemask 10 to a user's 12 face when the straps 40 engage the user's ears and securely fit the face covering to the user's face such that the face covering covers at least the nose and mouth of the user.

The nose and mouth covering element 38 may be made of a flexible sheet element which conforms to the shape of the users face when the facemask is secured to the users face as shown in FIG. 2.

The flexible sheet element may take many different forms and is a conventional standard known element and, as such, will not be described any further herein.

The virus protection device 16 is connected to the face covering 18 by depositing and using an adhesive for bonding the virus protection device onto said article of face covering 18. As these are standard known procedures, they will not be explained in any further detail herein.

The power supply 20 comprises a battery 41 and conducting wires 43 which are configured for supplying electrical power to the first and second electrodes 22, 24 of the virus protection device 16 in order to energize the virus protection device 16. The battery 41 is a 1-volt DC battery which is embedded in a pocket formed therefore in the wearable face covering 18 as best illustrated in FIG. 2 of the drawings. The connecting wires 43 are also contained in a pocket provided therefore in the wearable face covering as illustrated in FIG. 2 of the drawings.

In use, the power supply 20 energizes the first and second electrodes 22,24 of the virus protection device 16 and energizes the multiple nodes of opposed positive and negative electrodes 36.1, 36.2 which are spaced an equal distance 44 apart from one another.

It will be understood the electric field is equal to the voltage divided by the distance $$E = V/d \quad (1)$$

It will be understood that since the voltage of the battery 40 is 1 volt and the predetermined spaces defined between the multiple nodes of opposed positive and negative electrodes 36.1, 36.2 is approximately 50 nm (distance 44), the electric field passing through the predetermined spaces between the positive and negative electrodes is approximately 20 M volts per meter. This is sufficient to incapacitate any virus passing through the spaces between the positive and negative electrodes. More specifically as illustrated in FIG. 4 of the drawings, when a virus 14 passes through the space between the electrodes 36.1, 36.2, a current will flow through/across the virus 14. This current incapacitates the virus 14 and renders it harmless. The inventors have found that a current of between 1 uA to 100 mA is ideal The inventors have advantageously found that the distance 44 (predetermined spaces between the opposed positive and negative electrodes 36.1, 36.2) should be as small as possible to maximise the applied electrical field passing though the predetermined spaces.

The inventors have found that the distance 44 will be varied depending on the specific virus/viruses which is sought to protect the user from. Most viruses vary in size from 5 to 400 nm. The inventors envisage that the distance 44 may accordingly vary from 4 nm to 500 nm.

The inventors have also advantageously found that the predetermined spaces between the opposed positive and negative electrodes 36.1, 36.2 form air flow passages 44 through which air may flow through the virus protection device.

In use, the inventors have advantageously found that the fractal-like structure 25 enhances the surface area of the first and the second flexible electrodes 22,24 and thereby maximize a volume of said predetermined spaces. By maximizing the volume of the predetermined spaces between the electrodes, the inventors have found that the virus protection device 16 becomes highly efficient at incapacitating viruses 14 as more space is available for incapacitating viruses. This is highly advantageous over previous known masks as the use of known masks results in an accumulation of dangerous viruses on the masks which can later either be transferred onto the user's hands or clothing and later result in infecting the user. By incapacitating the viruses, the virus protection device reduces the chances of the user becoming infected by viral particles trapped in the mask.

Furthermore, the fractal-like structure 25 establishes a uniform electric field across the virus protection device 16. This is an extremely important feature as uniformity of the electrical field ensures that the electrical field is sufficiently strong at all points of the space between the electrodes 36.1, 36.2 such that a virus 14 entering the electrical field will be incapacitated. In other words, uniformity of the electrical field ensures that there are no points through which a virus can pass between the electrodes 36.1, 36.2 without being incapacitated and rendered harmless.

The inventors have found that the flexibility of the first flexible electrode 22 and the second flexible electrode 24 and the flexible backing later 26 are important due to the fact that the virus protection device 16 is applied to the face covering 18, which is also flexible and which together with the first flexible electrode 22 and the second flexible electrode 24 and the flexible backing later 26 must confirm to a shape of the users face when the face covering 18 is fitted to the face as shown in FIG. 2 of the drawings.

Figure 5:
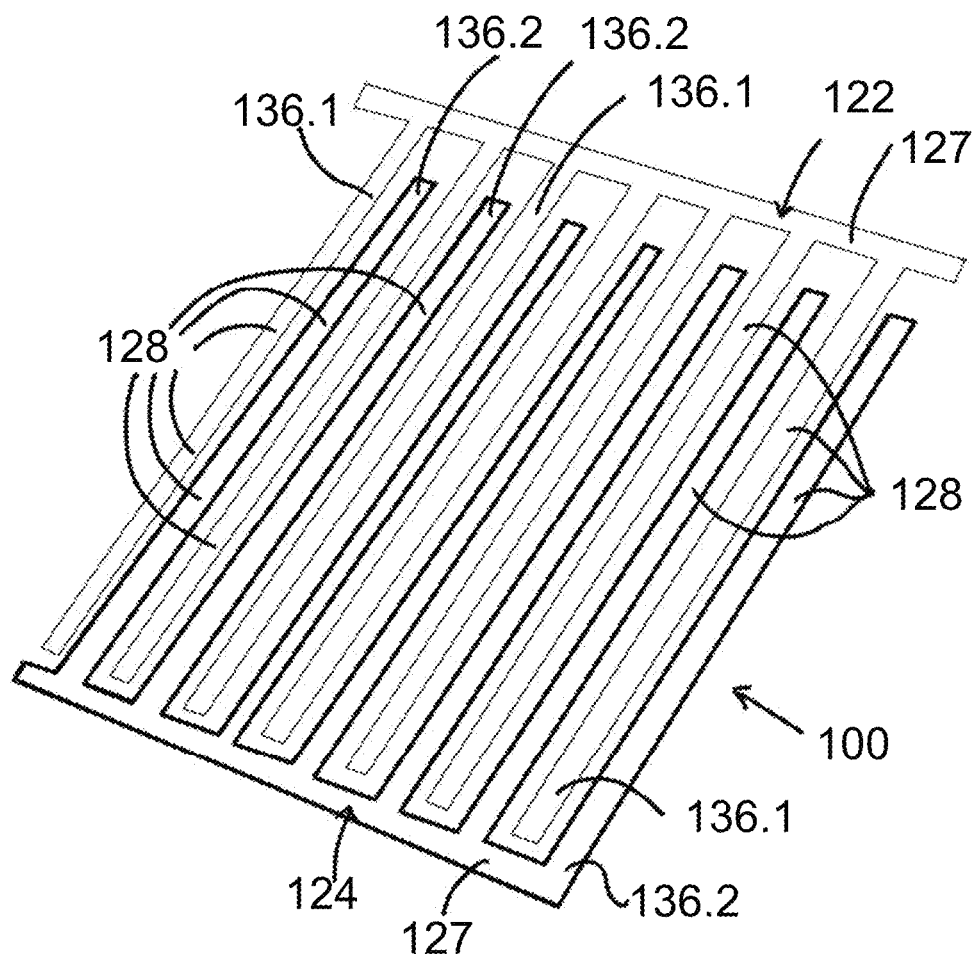
FIG. 5 shows a schematic view of another embodiment of a virus protection device in accordance with the first aspect of the invention.

With reference to FIG. 5 of the drawings another embodiment of a virus protection device in accordance with the invention is designated generally by the reference numeral 100.

There are many similarities between the virus protection device 16 of FIGS. 1 to 4 of the drawings and the virus protection device 100 of FIG. 5 of the drawings. In FIG. 5 of the drawings features of the virus protection device 100 which are the same and/or similar to features of the virus protection device 16 shown in FIGS. 1 to 4 of the drawings, are designated by the same and/or similar reference numerals in FIG. 5 of the drawings. What is stated above with respect to the virus protection device 16 of FIGS. 1 to 4 of the drawings applies generally to the virus protection device 100 of FIG. 5 the drawings.

As shown in FIG. 5 of the drawings, the virus protection device 100 comprises a first flexible electrode 122 and a second flexible electrode 124.

The first flexible electrode 122 and the second flexible electrode 124 each comprising a main branch 127 and a number of spaced side branches 128 which branch off from the main branch 127 of the first flexible electrode 122 and the second flexible electrode 124.

The spaced side branches 128 are arranged in an interdigitated arrangement as shown in FIG. 5. The main branches 127 and the side branches 128 together define multiple nodes of opposed positive electrodes 136.1 and negative electrodes 136.2 which are spaced an equal distance apart from one another.

Figure 6:
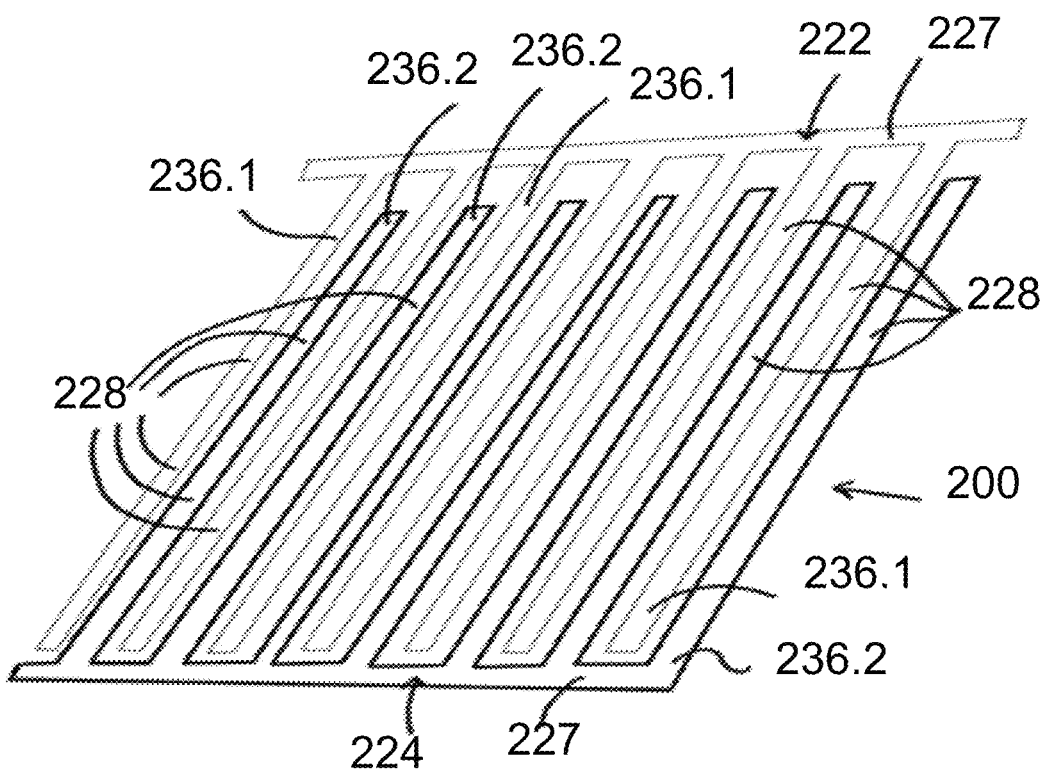
FIG. 6 shows a schematic view of another embodiment of a virus protection device in accordance with the first aspect of the invention.

With reference to FIG. 6 of the drawings another embodiment of a virus protection device in accordance with the invention is designated generally by the reference numeral 200.

There are many similarities between the virus protection device 16 of FIGS. 1 to 4 of the drawings and the virus protection device 200 of FIG. 6 of the drawings. In FIG. 6 of the drawings features of the virus protection device 300 which are the same and/or similar to features of the virus protection device 16 shown in FIGS. 1 to 4 of the drawings, are designated by the same and/or similar reference numerals in FIG. 6 of the drawings. What is stated above with respect to the virus protection device 16 of FIGS. 1 to 4 of the drawings applies generally to the virus protection device 200 of FIG. 6 the drawings.

As shown in FIG. 6 of the drawings, the virus protection device 200 comprises a first flexible electrode 222 and a second flexible electrode 224.

The first flexible electrode 222 and the second flexible electrode 224 each comprising a main branch 227 and a number of spaced side branches 228 which branch off from the main branch 227 of the first flexible electrode 222 and the second flexible electrode 224.

The spaced side branches 228 are arranged in an interdigitated arrangement as shown in FIG. 6. The main branches 227 and the side branches 228 together define multiple nodes of opposed positive electrodes 236.1 and negative electrodes 236.2 which are spaced an equal distance apart from one another.

Another major difference between the virus protection device 16 of FIGS. 1 to 4 of the drawings and the virus protection device 200 of FIG. 6 of the drawings can be found in the size of the predetermined spaces between the opposed positive and negative electrodes 236.1, 236.2. More specifically, the predetermined spaces between the positive and negative electrodes 236.1, 236.2 is dimensioned to be smaller than a dimension of the virus, thereby to provide a filter preventing the virus from passing through the predetermined spaces between the positive and negative electrodes.

As such, the inventors have advantageously found that the viruses are trapped/caught against the positive and negative electrodes 236.1, 236.2 will be incapacitated when the current passes through/over the viruses which contact the positive and negative electrodes.

As previously stated, the inventors envisage that by applying the electrical field to the virus, as described hereinabove, the virus is either fully destroyed, or partially destroyed or at least rendered inactive due to being incapacitated.

It will be appreciated that the exact configuration of the facemask 10 and the virus protection device 16, in accordance with the invention, may vary greatly while still incorporating the essential features of the invention as described hereinabove. For example, the inventors envisage that the battery 41 may be replaced by a coupled transformer to provide for wireless transmission for energizing the first and second electrodes 22,24 of the virus protection device 16 and energizes the multiple nodes of opposed positive and negative electrodes 36.1, 36.2.

Figure 7B:
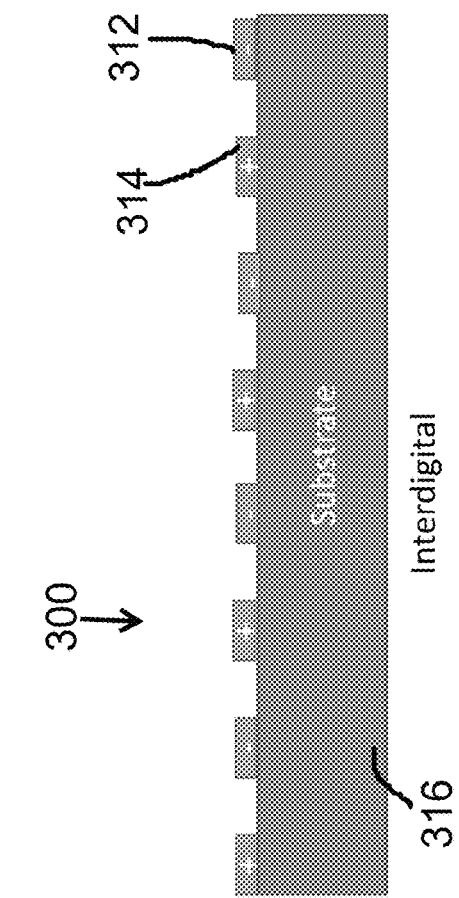
FIG. 7B shows a side view of the device of FIG. 7A.
Figure 7D:
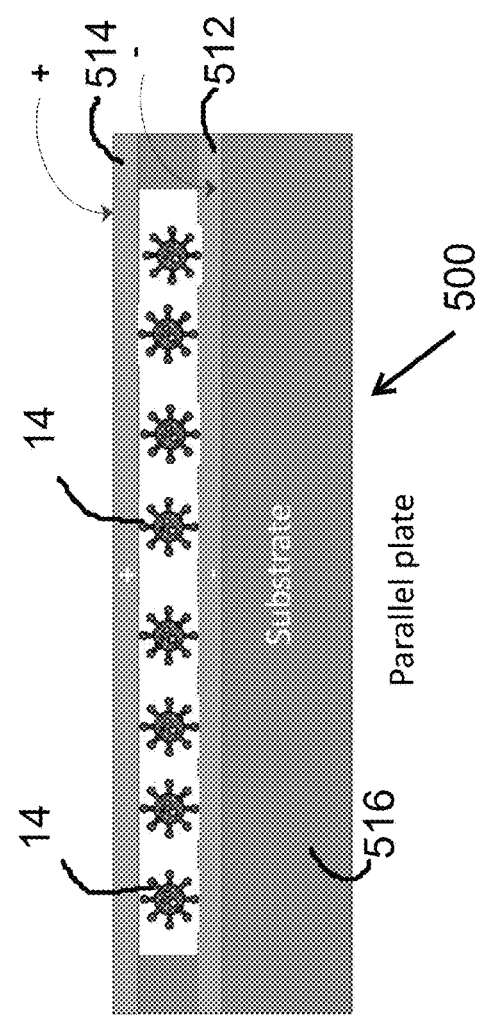
FIG. 7D show a side view of yet another embodiment of a device for making a vaccine in accordance with the third aspect of the invention.
Figure 7A:
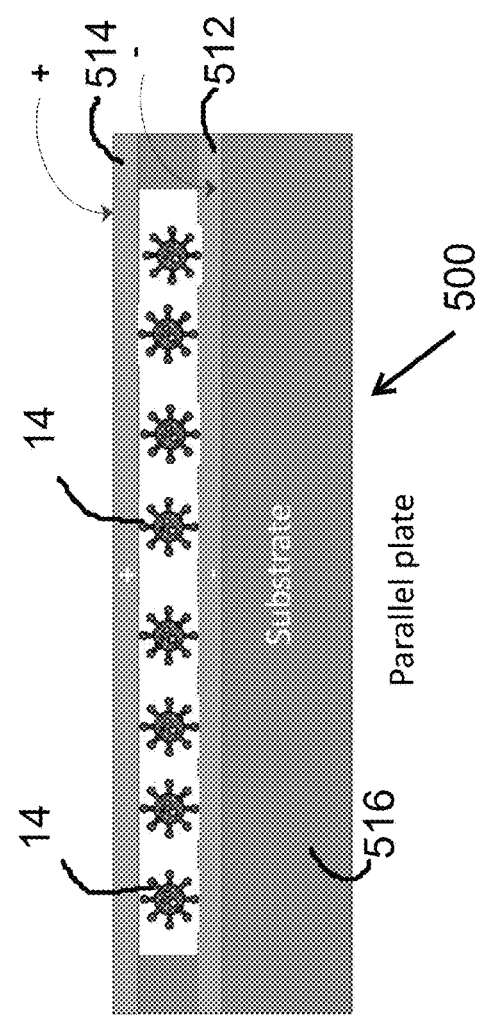
FIG. 7A shows a top view of an embodiment of a device for making a vaccine in accordance with a third aspect of the invention.

With reference to FIGS. 7A and 7B of the drawing an embodiment of a device for making a vaccine in accordance with a third aspect of the invention designated generally by the reference numeral 300.

The device 300 comprises a DC power source 310, an AC power source 311, a pair of interdigitated electrodes 312 and 314 arranged on a substrate 316. The distance between the electrodes 312 and 314 is dependent upon the virus 14 diameter. The electrodes 312 and 314 are configured and arranged in an interdigitated arrangement.

The inventors envisage that the virus functionality and infectivity is affected through the application of electrical current through it. The Applicant envisages that the current depends on the kind of the virus and its corresponding (Viral Transport Medium VTM.

The inventors further envisage that the current application period; i.e. the time period for applying the current depends also on the kind of the virus and its corresponding VTM.

The inventors envisage that after this application of the current; the virus is no longer able to infect a host and can be used as vaccine against virulent viruses of the same type. Accordingly, the inventors envisage that it is possible to create a corresponding vaccine for a disease by subjecting its corresponding virus to AC superimposed with DC bias which will affect its infectivity and destroy its physiology and communicability.

Figure 7C:
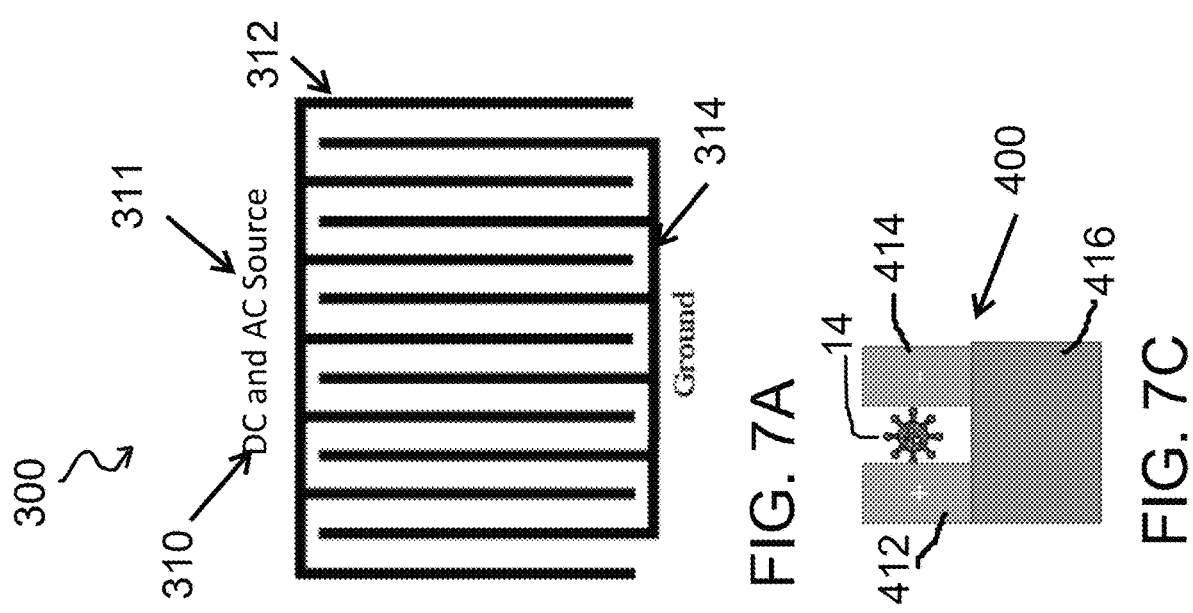
FIG. 7C shows a side view of another embodiment of a device for making a vaccine in accordance with the third aspect of the invention.

With reference to FIG. 7C of the drawing another embodiment of a device for making a vaccine in accordance with the third aspect of the invention designated generally by the reference numeral 400.

The device 400 comprises a DC power source 310, an AC power source 311, a pair of electrodes 412 and 414 arranged on a substrate 416. The distance between the electrodes 412 and 414 is dependent upon the virus 14 diameter. The electrodes 412 and 414 are arranged in a parallel plate topography.

The inventors envisage that the virus functionality and infectivity is affected through the application of electrical current through it. The Applicant envisages that the current depends on the kind of the virus and its corresponding (Viral Transport Medium VTM.

The inventors further envisage that the current application period; i.e. the time period for applying the current depends also on the kind of the virus and its corresponding VTM.

The inventors envisage that after this application of the current; the virus is no longer able to infect a host and can be used as vaccine against virulent viruses of the same type. Accordingly, the inventors envisage that it is possible to create a corresponding vaccine for a disease by subjecting its corresponding virus to AC superimposed with DC bias which will affect its infectivity and destroy its physiology and communicability.

With reference to FIG. 7D of the drawing yet another embodiment of a device for making a vaccine in accordance with the third aspect of the invention designated generally by the reference numeral 500.

The device 500 comprises a DC power source 310, an AC power source 311, a pair of electrodes 512 and 514 arranged on a substrate 516. The distance between the electrodes 512 and 514 is dependent upon the virus diameter. The electrodes 512 and 514 are arranged in a parallel plate topography.

The inventors envisage that the virus functionality and infectivity is affected through the application of electrical current through it. The Applicant envisages that the current depends on the kind of the virus and its corresponding (Viral Transport Medium VTM.

The inventors further envisage that the current application period; i.e. the time period for applying the current depends also on the kind of the virus and its corresponding VTM.

The inventors envisage that after this application of the current; the virus is no longer able to infect a host and can be used as vaccine against virulent viruses of the same type. Accordingly, the inventors envisage that it is possible to create a corresponding vaccine for a disease by subjecting its corresponding virus to AC superimposed with DC bias which will affect its infectivity and destroy its physiology and communicability.

Figure 8:
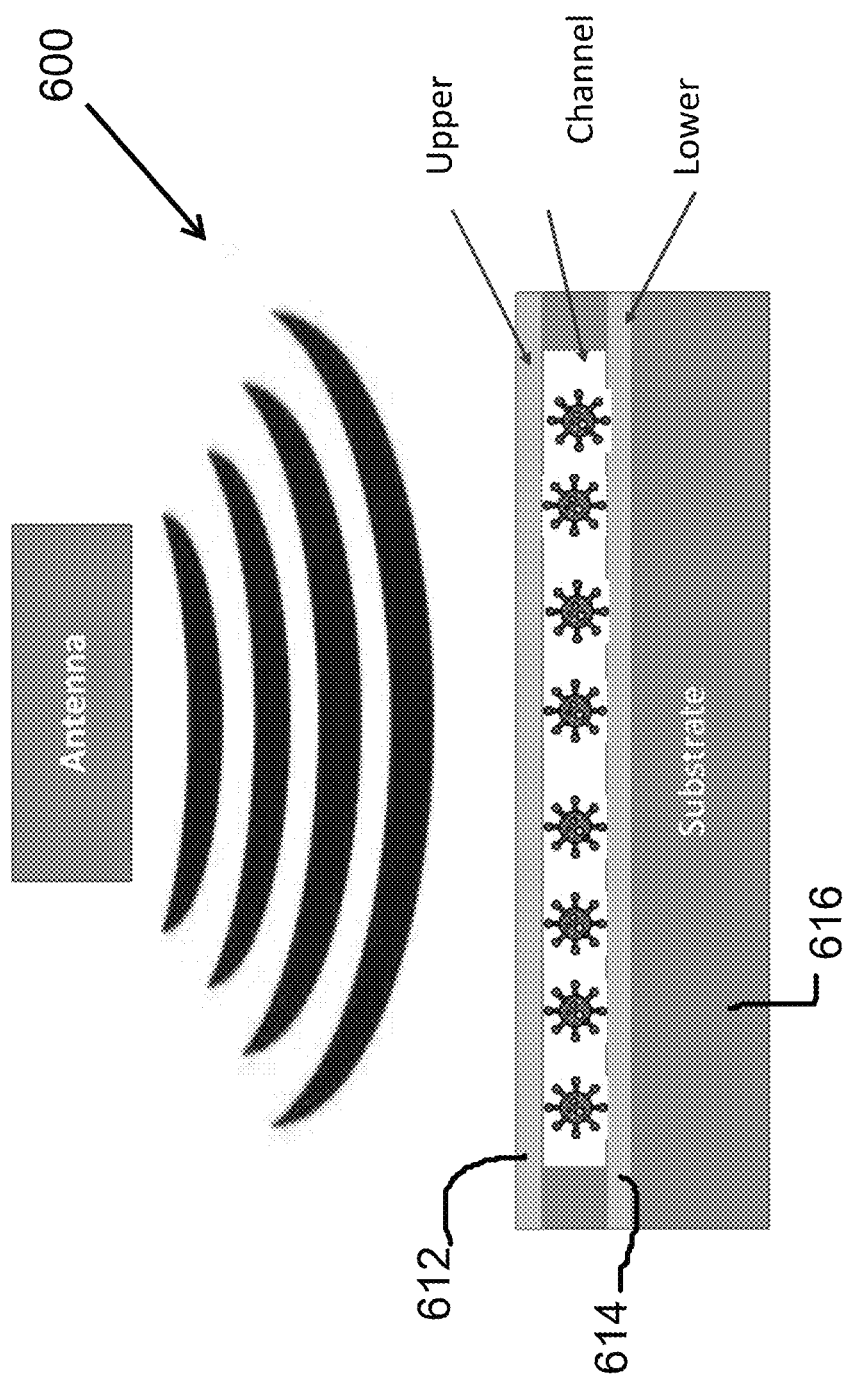
FIG. 8 shows a side view of a different embodiment of a device for making a vaccine in accordance with the third aspect of the invention

With reference to FIG. 8 of the drawing a different embodiment of a device for making a vaccine in accordance with the third aspect of the invention designated generally by the reference numeral 600.

The device 600 comprises a pair of electrodes 612 and 614 arranged on a substrate 616. The distance between the electrodes 612 and 614 is dependent upon the virus diameter. The electrodes 612 and 614 are arranged in a parallel plate topography. The device 600 further comprises a Radio Frequency Antenna (RF Antenna). Electrical current is then applied through the use of the RF Antenna. The antenna power, frequency and radiation pattern is designed based on the virus VTM, its kind and dimensions.

The inventors envisage that the virus functionality and infectivity is affected through the application of electrical current through it. The Applicant envisages that the current depends on the kind of the virus and its corresponding (Viral Transport Medium VTM.

The inventors further envisage that the current application period; i.e. the time period for applying the current depends also on the kind of the virus and its corresponding VTM.

The inventors envisage that after this application of the current; the virus is no longer able to infect a host and can be used as vaccine against virulent viruses of the same type. Accordingly, the inventors envisage that it is possible to create a corresponding vaccine for a disease by subjecting its corresponding virus to AC superimposed with DC bias which will affect its infectivity and destroy its physiology and communicability.

Referring now to FIGS. 7A to 7D and FIG. 8 of the drawings and with reference to the devices for making a vaccine 300,400,500, and 600, what is stated below applies equally to all of the devices 300,400,500 and 600.

The inventors envisage that the frequency and signal strength of the AC source and the DC sources ranges are as set out below:
1. DC field ranges from about 1V per μm to about 20 V per μm, depending on the virus type, its dimensions and buffer media;
2. AC amplitude ranges from about 1 mV per μm to about 20 V per μm, depending on the virus type, its dimensions and buffer media;
3. AC frequency ranges from about 1 Hz up to about 1 THz, depending on the virus type, its dimensions and buffer media.

The inventors envisage that after applying the current (as described above) the virus while being unable to infect the user, may still be capable of triggering an immune response in the user when the user is exposed to the virus after application of the current.

More particularly, the inventors envisage that the virus after application of the current (described above) will act as an antigen. More specifically, the inventors envisage that the virus after application of the current (described above) will activate immune system "memory". Even more specifically, the inventors envisage that the virus after application of the current (described above) will activate B cells and sensitized T cells. As such, the inventors envisage that exposure to the virus particles after application of the current (described above) will prepare the users immune system to react more efficiently to future exposure to active viruses. In other words, the inventors envisage that exposing the user to the virus after application of the current (described above) will result in immunizing the user against future viral exposure, i.e. to exposure to active and or virulent forms of the incapacitated virus.

The invention extends to a method of making a vaccine as described hereinabove and as illustrated in FIGS. 7A-7D and 8 of the drawings.

It will be appreciated that the exact configuration of the device for making a vaccine 300, 400, 500 and 600, in accordance with the invention, may vary greatly while still incorporating the essential features of the invention as described hereinabove.

We claim:

1. A virus protection device for protecting a user from a virus, the virus protection device including:
at least one first flexible electrode formed of graphene and at least one second flexible electrode formed of graphene; the at least one first flexible electrode and the at least one second flexible electrode being connectable to an electrical power source for supplying electrical power to the at least one first flexible electrode and the second flexible electrode,
the at least one first flexible electrode comprising a first major side and an opposite second major side and the at least one second flexible electrode having a first major side and an opposite second major side, wherein the first major side of the first flexible electrode and the first major side of the second flexible electrode are on a first side, and the second major side of the first flexible electrode and the second major side of the second flexible electrode are on a second side that is opposite to the first side, said first major sides and second major sides being the sides of the first and second flexible electrodes with the greatest surface areas, the at least one first flexible electrode and the at least one second flexible electrode being configured and arranged in a fractal arrangement wherein the at least one first flexible electrode and the at least one second flexible electrode together define multiple nodes of opposed positive electrodes and negative electrodes which are spaced an equal distance apart from one another, thereby to define predetermined spaces there between, through which an electrical field is generated between the positive and negative flexible electrodes, said predetermined spaces forming air flow passages through which air flows, in use, from the first major sides of the at least one first flexible electrode and the at least one second flexible electrode to the second major sides of the at least one first flexible electrode and the at least one second flexible electrode.

2. The virus protection device as claimed in claim 1, wherein the at least one first flexible electrode and the at least one second flexible electrode each comprise a main branch and side branches extending outwardly from the main branch of the at least one first flexible electrode and the at least one second flexible electrode, and wherein the main branch of the at least one first flexible electrode and the at least one second flexible electrode and the side branches together define said multiple nodes of opposed positive and negative electrodes.

3. The virus protection device as claimed in claim 2, wherein the side branches define one or more secondary branches which extend outwardly from the side branches and wherein the main branch of the at least one first flexible electrode and the at least one second flexible electrode, the side branches and the secondary branches together form said multiple nodes of opposed positive and negative electrodes.

4. The virus protection device as claimed in claim 3, wherein the secondary branches define one or more tertiary branches which extend outwardly from the secondary branches and wherein the main branch of the at least one first flexible electrode and the at least one second flexible electrode, the side branches, the secondary branches and the tertiary branches together form said multiple nodes of opposed positive and negative electrodes.

5. The virus protection device as claimed in claim 4, wherein the tertiary branches define one or more subsequent branches which extend outwardly from the tertiary branches and wherein the main branch of the at least one first flexible electrode and the at least one second flexible electrode, the side branches, the secondary branches, the tertiary branches and the subsequent branches together form said multiple nodes of opposed positive and negative electrodes.

6. The virus protection device as claimed in claim 1, wherein said predetermined spaces between the opposed positive and negative electrodes are dimensioned to be smaller than a dimension of the virus, thereby to provide a filter preventing the virus from passing through the predetermined spaces between the positive and negative electrodes.

7. The virus protection device as claimed in claim 1, wherein said predetermined spaces between the opposed positive and negative electrodes are dimensioned to permit the virus to pass into said predetermined spaces such that the electrical current flowing between the positive and negative flexible electrodes passes through the virus, thereby to incapacitate the virus.

8. The virus protection device as claimed in claim 7, wherein said predetermined spaces and an electrical output of the power source are selected such that a virus passing though one of said spaces is incapacitated when a current flows through the virus when the virus passes through one of said spaces.

9. The virus protection device as claimed in claim 1, wherein a distance between the opposed positive and negative electrodes range from between 4 nm to 500 nm.

10. The virus protection device as claimed in claim 1, wherein the distance between the opposed positive and negative electrodes range from between 4 nm and 100 nm.

11. The virus protection device as claimed in claim 1, wherein said predetermined spaces form air flow passages through which air flows through the virus protection device.

12. The virus protection device as claimed in claim 1, wherein the virus protection device includes said electrical power source and wherein said electrical power source is in the form of a battery.

13. The virus protection device as claimed in claim 12, wherein the battery is a direct current (DC) power source.

14. The virus protection device as claimed in claim 12, wherein the battery supplies a current of 1 uA to 100 mA.

15. The virus protection device as claimed in claim 12, wherein the battery supplies a voltage up to 3 volts.

16. An article of apparel including the virus protection device as claimed in claim 1.

17. The article of apparel as claimed in claim 16, wherein the article of apparel is a facemask.

18. The article of apparel as claimed in claim 16, wherein the article of apparel further includes a power supply for supplying said electrical power to the virus protection device.

19. The virus protection device as claimed in claim 1, wherein the electrical field generated between the first and second flexible electrodes is a uniform electric field.

* * * * *